US010435921B2

(12) United States Patent
Nakasone (10) Patent No.: US 10,435,921 B2
(45) Date of Patent: Oct. 8, 2019

(54) LOCKING DEVICE FOR OPENING/CLOSING MEMBER (71) Applicant: PIOLAX, INC., Yokohama-shi (JP)

(72) Inventor: Hisashi Nakasone, Yokohama (JP)

(73) Assignee: PIOLAX, INC., Yokohama-Shi, Kanagawa (JP)

( * ) Notice: Subject to any disclaimer, the term of this patent is extended or adjusted under 35 U.S.C. 154(b) by 315 days.

(21) Appl. No.: 15/305,969

(22) PCT Filed: Apr. 20, 2015

(86) PCT No.: PCT/JP2015/061984
§ 371 (c)(1),
(2) Date: Oct. 21, 2016

(87) PCT Pub. No.: WO2015/163282
PCT Pub. Date: Oct. 29, 2015

(65) Prior Publication Data
US 2017/0044803 A1 Feb. 16, 2017

(30) Foreign Application Priority Data
Apr. 24, 2014 (JP) .................................. 2014-089721

(51) Int. Cl.
E05B 77/36 (2014.01)
E05B 83/30 (2014.01)
E05C 9/04 (2006.01)
B60R 7/06 (2006.01)

(52) U.S. Cl.
CPC ................ E05B 77/36 (2013.01); B60R 7/06 (2013.01); E05B 83/30 (2013.01); E05C 9/04 (2013.01); E05C 9/043 (2013.01)

(58) Field of Classification Search
CPC ............. Y10T 292/08; Y10T 292/0801; Y10T 292/0834; Y10T 292/0837;
(Continued)

(56) References Cited

U.S. PATENT DOCUMENTS 3,006,673 A * 10/1961 Swick .................. A47B 91/066
16/38
5,562,357 A * 10/1996 Sandell ............... F16C 11/0657
403/122
(Continued)

FOREIGN PATENT DOCUMENTS

JP 2007-100343 A 4/2007
JP 4699160 B2 6/2011
(Continued)

OTHER PUBLICATIONS

Computer Generated Translation for WO 2013/099601, Translation generated on Oct. 31, 2018, https://worldwide.espacenet.com/ (Year: 2018).*
(Continued)

Primary Examiner — Alyson M Merlino
(74) Attorney, Agent, or Firm — McGinn I.P. Law Group, PLLC.

(57) ABSTRACT

A locking device includes: a rotating member having a support shaft and a protrusion provided at a position deviated with respect to the support shaft; a sliding rod that connects to the rotating member due to the protrusion being fit into a recess provided at a base end side; and an unlocking member that unlocks by causing the rotating member to rotate. The recess includes: a pair of restricting walls facing each other in a length direction of the sliding rod; a pair of elastic side walls facing each other in a width direction of the sliding rod having hook portions that engage with the base end side of the head of the protrusion; and an elastic bottom wall that receives the leading end side of the protrusion.

19 Claims, 8 Drawing Sheets (58) Field of Classification Search
CPC ........... Y10T 292/0839; Y10T 292/084; Y10T 292/42; Y10T 292/438; Y10T 403/32631; Y10T 403/32713; Y10T 403/32819; Y10T 403/32852; Y10T 292/57; Y10T 292/0844; E05B 83/28; E05B 83/30; E05B 77/36; E05B 79/10; E05B 79/12; E05B 79/14; E05B 79/16; E05C 9/00; E05C 9/002; E05C 9/006; E05C 9/04; E05C 9/042; E05C 9/043; E05C 9/10; E05C 9/14; E05C 9/16; Y10S 292/11; Y10S 292/38

See application file for complete search history.

(56) References Cited

U.S. PATENT DOCUMENTS

| | | | | |
|---|---|---|---|---|
| 5,653,548 | A | * | 8/1997 | Amdahl ............ F16C 11/0657 403/122 |
| 7,455,333 | B2 | * | 11/2008 | Ookawara ............... E05B 83/30 292/34 |
| 2007/0080542 | A1 | | 4/2007 | Ookawara |
| 2014/0008921 | A1 | | 1/2014 | Shimizu et al. |

FOREIGN PATENT DOCUMENTS

| | | | | |
|---|---|---|---|---|
| JP | 5698387 B2 * | 4/2015 | ............ E05B 83/30 |
| WO | WO-2010038716 A1 * | 4/2010 | ............ E05B 83/30 |
| WO | WO 2012/132546 A1 | 10/2012 | |
| WO | WO-2013018496 A1 * | 2/2013 | ............ E05B 83/30 |
| WO | WO 2013/099601 A1 | 7/2013 | |
| WO | WO-2017078121 A1 * | 5/2017 | ............ E05B 83/30 |

OTHER PUBLICATIONS

International Search Report (ISR) (PCT Form PCT/ISA/210), in PCT/JP2015/061984, dated Jun. 23, 2015.

* cited by examiner

LOCKING DEVICE FOR OPENING/CLOSING MEMBER

TECHNICAL FIELD

The present invention relates to a locking apparatus configured to lock releasably an opening and closing member by a sliding rod, the opening and closing member being attached to an opening portion of a mount-base member so as to be opened and closed.

BACKGROUND ART

For example, an opening and closing member such as a lid is attached to an opening portion formed in a mount-base member such as a glove box of a motor vehicle. A locking apparatus is provided. The locking apparatus locks the opening and closing member in a closed state with respect to the opening portion or unlocks the opening and closing member.

For example, Patent Literature 1 discloses a side locking apparatus which includes a retainer, a rotor, a pair of rods, a knob and a return spring. The rotor is supported rotatably on the retainer. The pair of rods are individually connected at their proximal end portions to point symmetric positions with respect to a shaft center of the rotor, and are supported such that respective distal end portions can project from and retract back into corresponding sides of a lid. The distal end portions can be brought into engagement with and disengagement from a circumferential edge of an opening portion. The knob is supported so as to be pushed against and pulled away from the retainer. The return spring is mounted on the rotor. When the knob is pulled, a pressing element of the knob presses against a bearing portion of the rotor, thereby rotating the rotor against a urging force of the return spring. As a result, the rods are retracted into the lid, and the lock is released.

In the side lock apparatus described above, the rods are connected rotatably to the rotor with spherical projections formed on the rotor allowed to fit in recess portions formed on the proximal end portions thereof. The recess portions each have an opening portion whose inside diameter is slightly smaller than an outside diameter of the spherical projections of the rotor, and a notched portion is provided on an end face of each of the rods. The notched portion is notched into a substantially circular shape having an inside diameter which is slightly smaller than the spherical portion. The notched portions allow the opening portions to expand so that the spherical projections of the rotor fit into the corresponding recess portions.

PRIOR ART LITERATURE

Patent Literature

Patent Literature 1: JP-A-2007-100343

SUMMARY OF THE INVENTION

Problem that the Invention is to Solve

However, in the side locking apparatus described in Patent Literature 1, the rods are attached to the rotor by fitting the spherical projections of the rotor in the recess portions which are provided at the proximal end portions of the rods. If it is attempted to reduce the inserting force required at the time of assemblage, rattling tends to be more easily caused after the rods are assembled to the rotor. Alternatively, if it is attempted to eliminate the rattling, the large inserting force is required.

An object of the invention is to provide an opening and closing member locking apparatus which can facilitate the assemblage of a rotary member (a rotor) and a sliding rod and while suppressing rattling after the assemblage.

Means for Solving the Problem

To achieve the object, the invention provides an opening and closing member locking apparatus configured to lock releasably an opening and closing member by a sliding rod, the opening and closing member being attached to an opening portion of a mount-base member so as to be opened and closed, the locking apparatus including:

a rotary member which is attached to either one of the mount-base member and the opening and closing member so as to rotate via a supporting shaft;

a projection which is provided on the rotary member at an eccentric position relative to the supporting shaft and which has a diametrically-expanded head portion at a distal end side thereof;

a sliding rod which is connected to the rotary member by fitting the projection in a recess portion provided at a proximal end side, which slides as the rotary member rotates and which is disengageably brought into engagement with an engaging portion which is provided on the other one of the mount-base member and the opening and closing member; and an unlocking member which unlocks the engagement between the sliding rod and the engaging portion by rotating the rotary member from a state in which the sliding rod is in engagement with the engaging portion, wherein the recess portion of the sliding rod includes:
 a pair of restricting walls which are inner surfaces of the recess portion facing each other in a lengthwise direction of the sliding rod and which are disposed so as to restrict the head portion of the projection from moving in a sliding direction; and
 a pair of elastic side walls which are inner surfaces of the recess portion facing each other in a widthwise direction of the sliding rod and which have nail portions, respectively, the nail portions being brought into engagement with a proximal end side of the head portion of the projection.

In carrying out the invention, there it may be provided the opening and closing member locking apparatus, wherein the bottom wall forms an elastic bottom wall which is brought into elastic abutment with a distal end side of the head portion of the projection.

There it may be provided
the opening and closing member locking apparatus,
wherein a distance between the elastic side walls is smaller than an outside diameter of the head portion of the projection, and
wherein a distance between engaging surfaces of the nail portions of the elastic side walls and the elastic bottom wall is smaller than a distance between an engaging portion of the head portion of the projection which is brought into engagement with the nail portions and an apex portion of the head portion.

There it may be provided
the opening and closing member locking apparatus,
wherein a pair of slits are provided to extend along both sides of the elastic bottom wall, and wherein the elastic side walls and the elastic bottom wall are allowed to deflect elastically by the slits.

There it may be provided the opening and closing member locking apparatus, wherein both ends of the pair of slits extend long over the pair of restricting walls.

Advantageous Effects of Invention

According to the invention, since the head portion of the projection of the rotary member is brought into engagement with the nail portions of the pair of elastic side walls to be held thereby, the assembling work can be performed easily. In addition, since the restricting walls are provided in the lengthwise direction of the sliding rod and the pair of elastic side walls are provided in the widthwise direction of the sliding rod, looseness after the assemblage can be suppressed.

BRIEF DESCRIPTION OF DRAWINGS

FIGS. 2A and 2B show a rotary member used in the locking apparatus.

FIGS. 4A to 4C show the construction of a recess portion at a distal end portion of a sliding rod of the locking apparatus.

FIGS. 6A and 6B show a locked state generated by the locking apparatus.

FIGS. 7A and 7B show an unlocked state generated by the locking apparatus.

FIGS. 8A to 8C show another embodiment of an opening and closing member locking apparatus of the invention.

MODE FOR CARRYING OUT THE INVENTION

An embodiment of an opening and closing member locking apparatus of the invention will be described by reference to FIGS. 1 to 7B.

As shown in FIGS. 6A to 7B, for example, an opening and closing member 40 such as a lid is attached to an opening portion of a mount-base member 36 such as an instrument panel of a motor vehicle so as to be opened and closed, and the opening and closing member locking apparatus 10 (locking apparatus 10) is used to lock releasably the opening and closing member 40 in a state in which the opening and closing member 40 closes the mount-base member 36. In this embodiment, a locking operation is executed by attaching the locking apparatus 10 to the opening and closing member 40 and inserting distal end portions 30 of sliding rods 28 into engaging portions 37 which are provided individually on inner walls on both sides of the opening portion of the mount-base member 36 in an disengaging fashion. However, the locking apparatus 10 can be attached to the mount-base member 36, and the engaging portions 37 can be provided on the opening and closing member 40.

Figure 1:
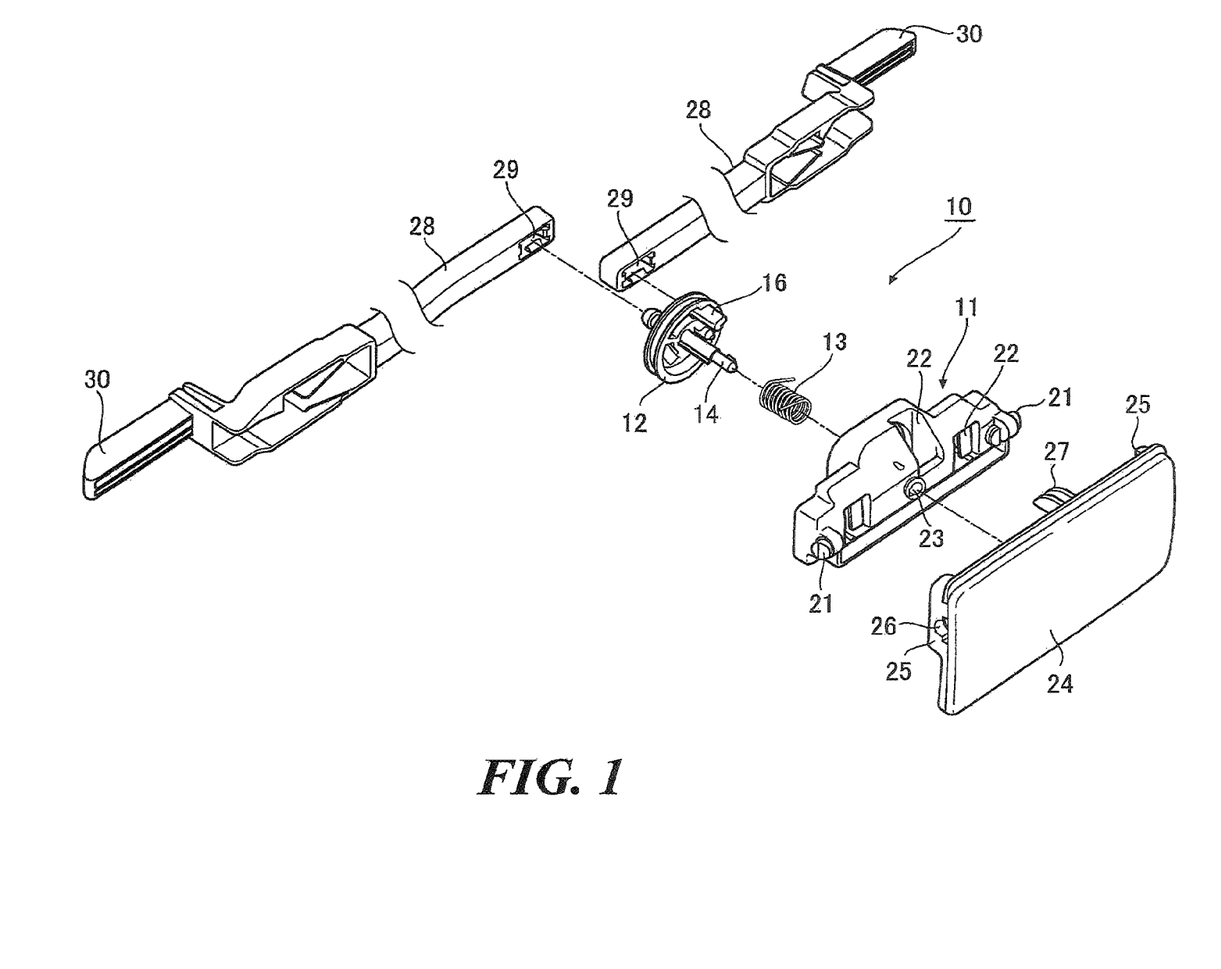
FIG. 1 is an exploded perspective view showing an embodiment of an opening and closing member locking apparatus of the present invention.

As shown in FIG. 1, this locking apparatus 10 includes an attaching base 11, a rotary member 12, a coil spring 13, the pair of sliding rods 28 and an operating handle 24. The attaching base 11 is mounted on an inner surface of the opening and closing member 40. The rotary member 12 is mounted rotatably on the attaching base 11. The torsional coil spring 13 rotationally urges the rotary member 12 in a predetermined direction. The pair of sliding rods 28 are pivotally attached to facing circumferential edge portions of the rotary member 12 at proximal end portions thereof so as to slide in opposite directions as a result of a rotational operation of the rotary member 12. The operating handle 24 is attached rotatably to the attaching base 11 so as to rotate the rotary member 12 by being pulled up, thereby withdrawing the pair of sliding rods 28 from the engaging portions 37 (refer to FIGS. 6A to 7B) to release the engagement therebetween.

Figure 2A:
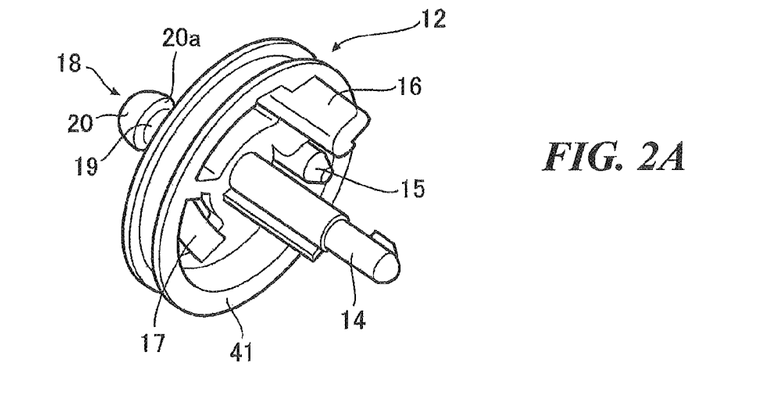
FIG. 2A is a perspective view as seen from a supporting shaft side.
Figure 2B:
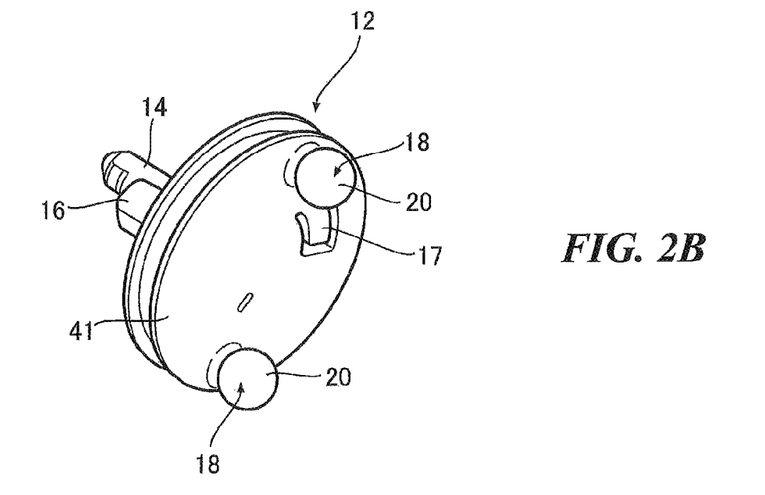
FIG. 2B is a perspective view as seen from a projection side.

As shown in FIGS. 2A and 2B, in this embodiment, the rotary member 12 has a circular disc-shaped main body 41, a supporting shaft 14 which is provided at a center of one side surface of the main body 41 so as to protrude therefrom and a pair of projections 18 which are provided in diametrically opposite positions on a circumferential edge of an opposite side surface of the main body 41 so as to project therefrom. The supporting shaft 14 is inserted into a supporting hole 23 (refer to FIG. 1) which is provided in the attaching base 11, whereby the rotary member 12 is supported rotatably on the attaching base 11. A lever bearing 16 is provided at one location on the circumferential edge of the side surface of the rotary member 12 where the supporting shaft 14 is provided so as to protrude therefrom, and a spring bearing 15 is provided at another location so as to protrude therefrom. The projections 18 each have a shaft portion 19 which is provided on the opposite side surface of the rotary member 12 so as to be erected therefrom and a head portion 20 which is formed at a distal end portion of the shaft portion 19 so as to have an expanded diameter. In this embodiment, the head portion 20 is almost semi-spherical, and a base portion thereof is formed into an engaging portion 20a which is contracted in diameter to form a step. A rotation stopper 17 is provided at one location on the circumferential edge of the main body 41 on the side surface where the supporting shaft 14 is formed, and this rotation stopper 17 forming a convex portion which gradually protrudes is an elastic piece which is formed via a U-shaped slit. When the rotary member 12 is attached to the attaching base 11, the rotation stopper 17 is brought into engagement with a projecting portion, not shown, of the attaching base 11 so as to restrict the rotary member 12 from rotating through a predetermined angle or more in a predetermined direction.

The torsional coil spring 13 is mounted on an outer circumference of the supporting shaft 14. The torsional coil spring 13 is in engagement with the spring bearing 15 at one end and is in engagement with a spring bearing, not shown, of the attaching base 11 at the other end thereof. The torsional coil spring 13 is configured to rotationally urge the rotary member 12 in a direction in which the pair of sliding rods 28 are pushed outwards. The rotational angle of the rotary member 12 is restricted by the rotation stopper 17 described above to such an extent that the sliding rods 28 are prevented from being pushed further outwards with the distal end portions 30 of the sliding rods 28 inserted to be brought into engagement with the corresponding engaging portions 37 of the mount-base member 36 (refer to FIGS. 6A and 6B).

Referring to FIG. 1 again, attaching shafts 21 are provided individually on both sides of the attaching base 11 so as to protrude therefrom for attaching the operating handle 24 to the attaching base 11. Additionally, the supporting hole 23 described above is formed through a central portion of the attaching base 11, and an opening portion 22 is formed on one side thereof so that a projection 27 on the operating handle 24, which will be described later, is inserted thereinto.

Plate-shaped brackets 25 are formed individually on both sides of an inner surface of the operating handle 24 so as to protrude therefrom, and attaching holes 26 are formed individually in the brackets 25. The operating handle 24 is attached rotatably to the attaching base 11 by causing the attaching shafts 21 of the attaching base 11 to fit in the corresponding attaching holes 26. The projection 27 passes through the opening portion 22 to protrude from an opposite side of the attaching base 11.

Figure 3:
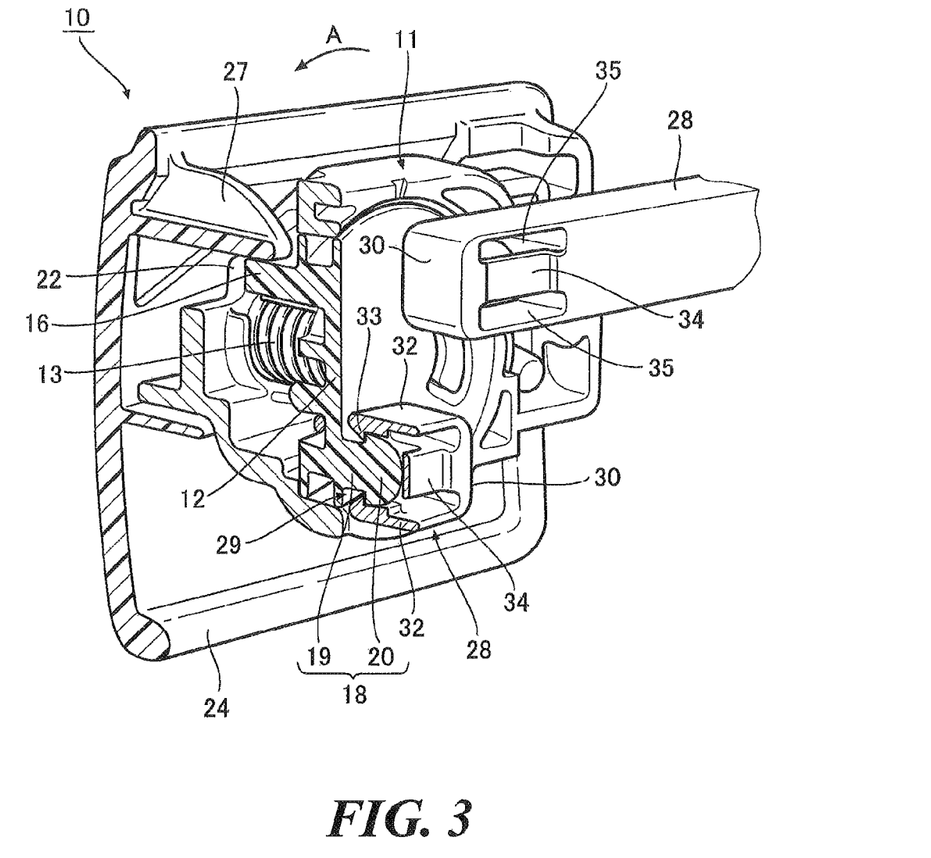
FIG. 3 is a partially cutaway perspective view showing a main part of the locking apparatus.

As shown in FIG. 3, the projection 27 which passes through the opening portion 22 to protrude from the opposite face side of the attaching base 11 is brought into abutment with the lever bearing 16 on the rotary member 12. When the operating handle 24 is rotated upwards via the attaching shafts 21 (refer to FIG. 1), the projection 27 pushes the lever bearing 16, whereby the rotary member 12 rotates in a direction indicated by an arrow A in FIGS. 3, 7A and 7B. As a result of the rotary member 12 rotating so, the pair of sliding rods 28 slide in a direction indicated by an arrow B in FIGS. 7A and 7B, whereby the distal end portions 30 of the sliding rods 28 are withdrawn from the corresponding engaging portions 37 of the mount-base member 36, allowing the opening and closing member 40 to be unlocked.

Figure 4A:
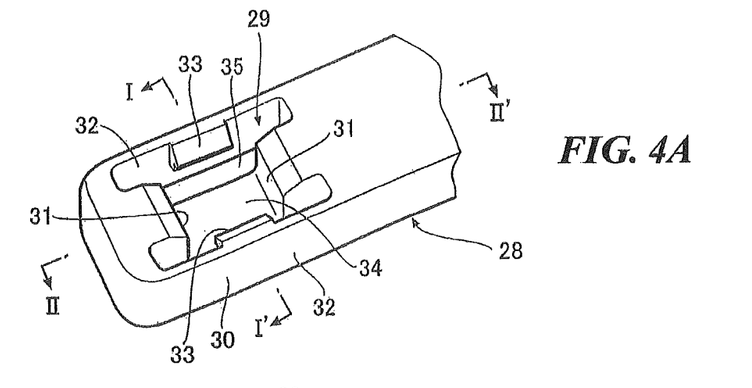
FIG. 4A is a perspective view as seen from a recess portion side.
Figure 4B:
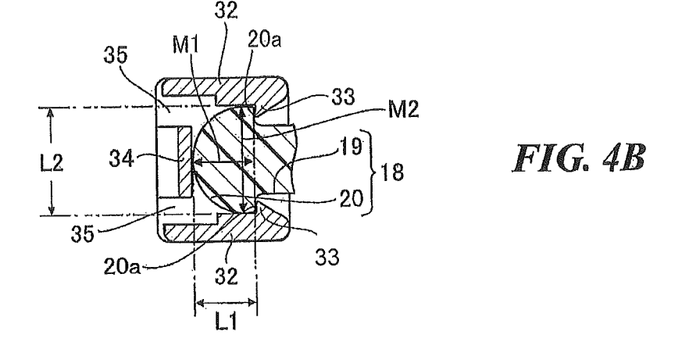
FIG. 4B is a sectional view taken along a line I-I' of FIG. 4A showing a state in which a projection of the rotary member is brought into engagement with the recess portion.
Figure 4C:
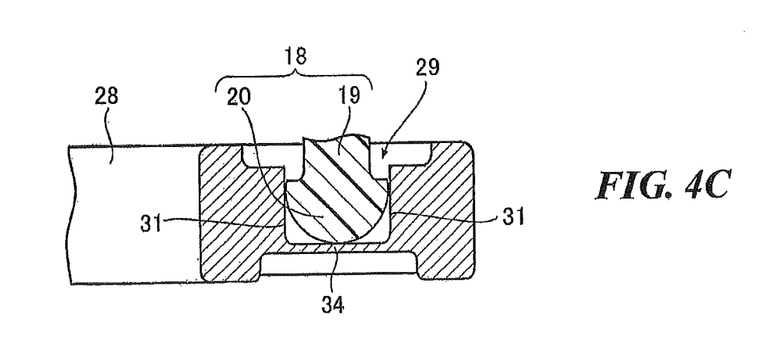
FIG. 4C is a sectional view taken along a line II-II' of FIG. 4A showing a state in which the projection of the rotary member is brought into engagement with the recess portion.
Figure 5:
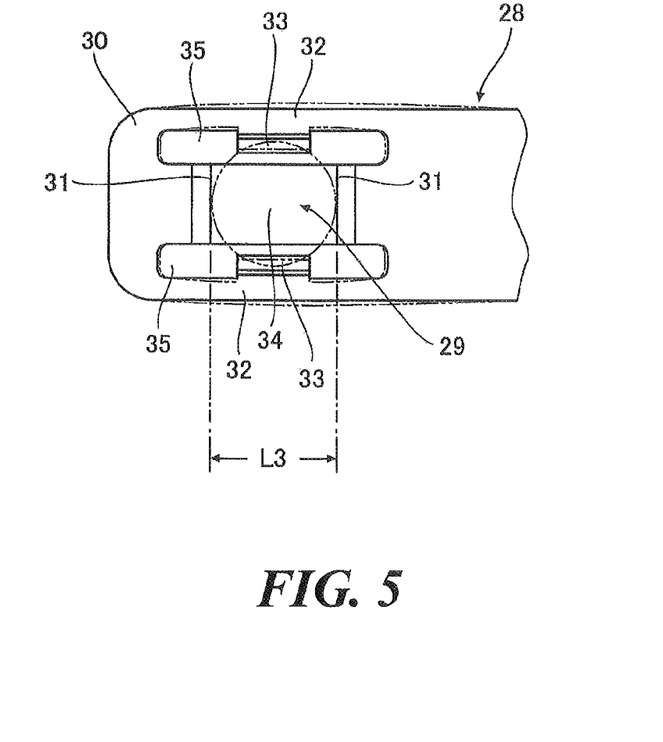
FIG. 5 is an explanatory view of the distal end portion of the sliding rod of the locking apparatus as seen from a recess portion side.

As shown in FIGS. 3 to 5, a recess portion 29 of each of the sliding rods 28 is surrounded by a pair of restricting walls 31 which face each other in a lengthwise direction of the sliding rod 28, a pair of elastic side walls 32 which face each other in a widthwise direction of the sliding rod 28 and an elastic bottom wall 34. A pair of slits 35 are formed individually on both sides of the elastic bottom wall 34 so as to extend longer than the pair of restricting walls 31, and these slits 35 allow to the elastic side walls 32 and the elastic bottom wall 34 to deflect elastically. In this way, both the elastic side walls 32 and the elastic bottom wall 34 can be deformed elastically by forming the pair of slits 35 on both the sides of the elastic bottom wall 34, and the elastic side walls 32 and the elastic bottom wall 34 are allowed to be deformed elastically more effectively by forming the slits 35 so as to extend from end to end longer than the pair of restricting walls 31.

On the other hand, the pair of restricting walls 31 are formed by wall portions which hardly deflect, and a space defined between the pair of restricting walls 31 almost matches an outside diameter of the head portion 20 of the projection 18 so as to restrict the head portion 20 from moving in a stoking direction. As a result, with the head portion 20 of the projection 18 inserted in the recess portion 29, the pair of restricting walls 31 which face each other in the sliding direction of the sliding rod 28 hold firmly the head portion 20 of the projection 18 so as to hardly deflect, thereby allowing the sliding rod 28 to slide accurately. The pair of elastic side walls 32 which face each other in the widthwise direction of the sliding rod 28 can suppress the rattling in the widthwise direction of the sliding rod 28 which would otherwise be generated by vibrations of the vehicle.

As shown in FIG. 4A, nail portions 33 are formed individually at upper edge portions of inner surfaces of the pair of elastic side walls 32 so as to engage with the engaging portion 20a of the head portion 20 of the projection 18. An open side of the nail portion 33 has a tapered surface which is tapered more as the nail portion 33 extends towards the elastic bottom wall 34, so as to make it easier for the head portion 20 of the projection 18 to be received.

As shown in FIG. 4B, a distance L1 between an engaging portion of the nail portion 33 and an inner surface of the elastic bottom wall 34 is set smaller than a distance M1 between the engaging portion 20a of the head portion 20 and an apex portion of the head portion 20 such that the head portion 20 of the projection 18 is not inserted. A distance L2 between the inner surfaces of the pair of elastic side walls 32 is set smaller than an outside diameter M2 of the head portion 20 in such a state the head portion 20 of the projection 18 is not inserted. As a result, when the head portion 20 of the projection 18 is inserted into the recess portion 29 so that the engaging portion 20a of the head portion 20 is brought into engagement with the nail portions 33 of the pair of elastic side walls 32, the elastic bottom wall 34 is brought into press contact with the apex portion of the head portion 20 in an elastic fashion, and the inner surfaces of the pair of elastic side walls 32 are then brought into press contact with an outer circumference of the head portion 20 in an elastic fashion.

In this way, the sliding rod 28 is attached to the projection 18 of the rotary member 12 with the elastic bottom wall 34 in press contact with the apex portion of the head portion 20 in the elastic fashion and the pair of elastic side walls 32 in press contact with the outer circumference of the head portion 20 in the elastic fashion, and therefore, the occurrence of rattling triggered by vibrations of the vehicle can be suppressed. Even though a dimension error is generated to some extent between internal dimensions of the recess portion 29 and outer dimensions of the head portion 20 of the projection 18 due to dimension variations at the time of molding, the dimension error can be absorbed, thereby maintaining the connected state without the rattling.

As shown in FIG. 5, when the head portion 20 of the projection 18 is inserted into the recess portion 29 for engagement therewith, the pair of elastic side walls 32 are curved outwards as indicated by imaginary lines from the dimensional relationships among L1, M1, L2, M2 described above. Similarly, although not shown, the elastic bottom wall 34 is also curved outwards. As a result, a distance L3 between the inner surfaces of the pair of restricting walls 31 tends to be narrowed, whereby it becomes easier for the inner surfaces of the pair of restricting walls 31 to be brought into tight contact with the head portion 20 of the projection 18. Consequently, the rattling between the head portion 20 of the projection 18 and the pair of elastic side walls 32 in the sliding direction of the sliding rod 28 is suppressed, thereby allowing the sliding rod 28 to slide accurately.

Figure 6A:
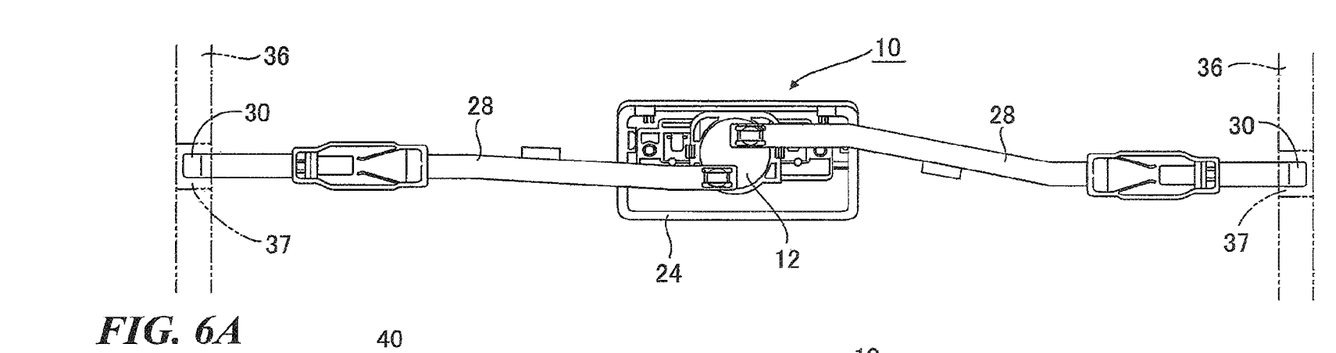
FIG. 6A is an explanatory view as seen from an inner surface side of an opening and closing member.
Figure 6B:
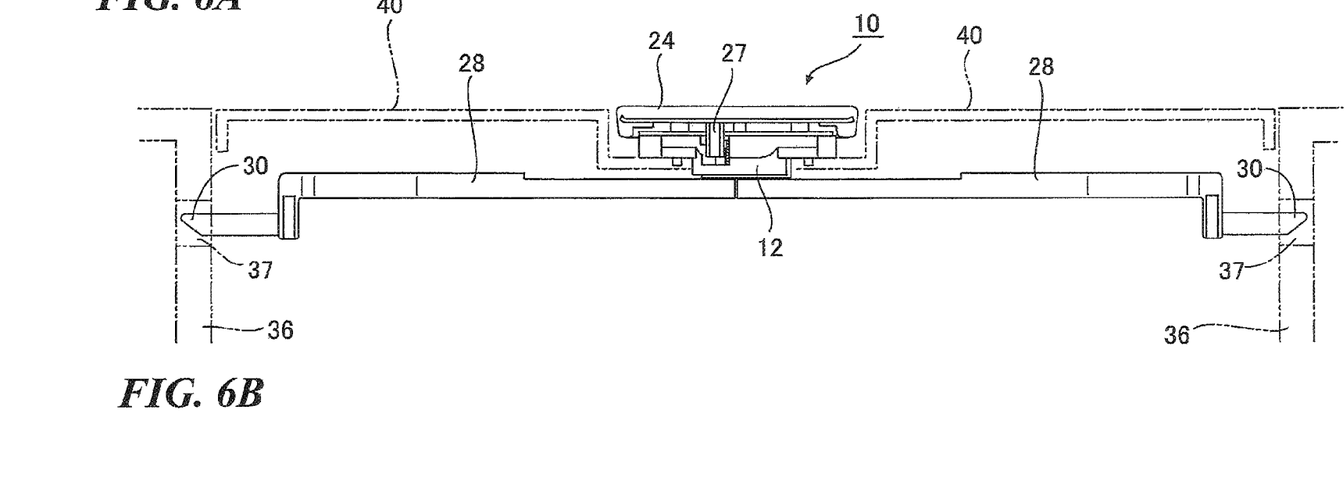
FIG. 6B is an explanatory view as seen from above the opening and closing member.

The operation of the locking apparatus 10 will be described briefly. As shown in FIGS. 6A and 6B, when the opening and closing member 40 is closed to close the opening portion of the mount-base member 36, the pair of sliding rods 28 are pressed against inner surfaces of the attaching holes 26, and the rotary member 12 rotates against the urging force of the torsional coil spring 13, whereby a distance between the distal end portions 30 of the pair of sliding rods 28 is contracted temporarily. When the distal end portions 30 reach the engaging portions 37 which are made up of holes formed on the inner surfaces of the mount-base member 36, the distance between the distal end portions 30 is expanded again by the urging force of the torsional coil spring 13, and the distal end portions 30 are inserted into the corresponding engaging portions 37, whereby the opening and closing member 40 is locked in a closed state.

Figures 7A, 7B:
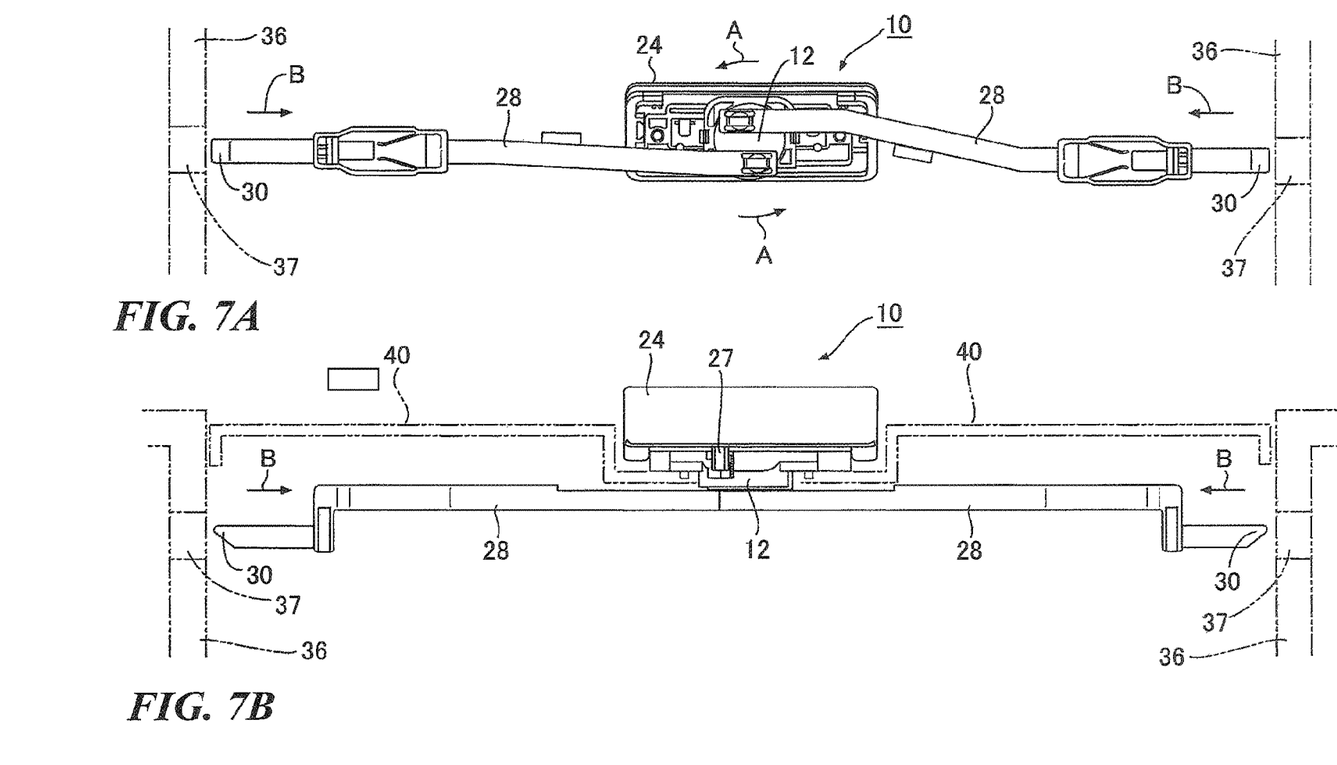
FIG. 7A is an explanatory view as seen from the inner surface side of the opening and closing member.
FIG. 7B is an explanatory view as seen from above the opening and closing member.

In attempting to unlock the opening and closing member 40, as shown in FIGS. 7A and 7B, when rotating the operating handle 24 upwards, the projection 27 pushes the lever bearing 16 (refer to FIG. 3), and the rotary member 12 rotates in a direction indicated by arrows A in FIGS. 7A and 7B, and the pair of sliding rods 28 slide in directions indicated by arrows B, whereby the distal end portions 30 of the sliding rods 28 are pulled out of the corresponding engaging portions 37 of the mount-base member 36, thereby unlocking the opening and closing member 40.

Figure 8A:
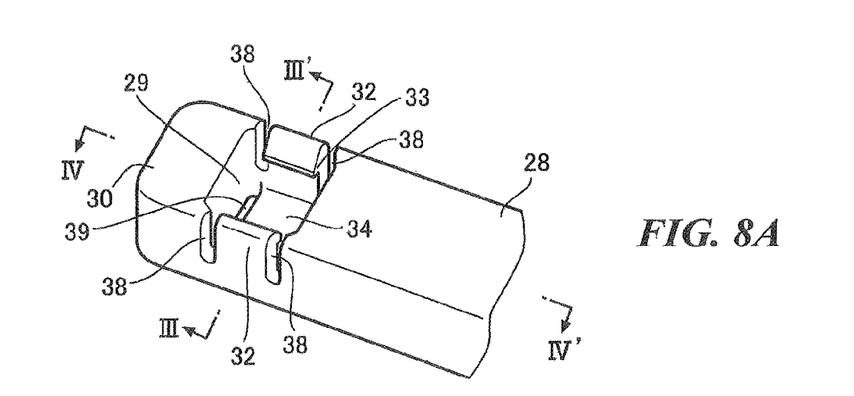
FIG. 8A is a perspective view of a sliding rod as seen from a recess portion side.
Figure 8B:
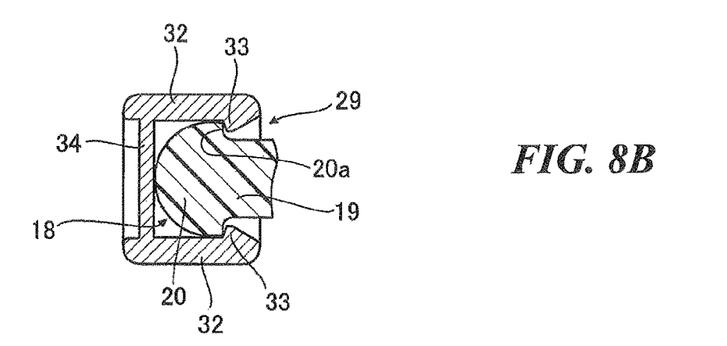
FIG. 8B is a sectional view taken along a line of FIG. 8A showing a state in which a projection of a rotary member is brought into engagement with a recess portion.
Figure 8C:
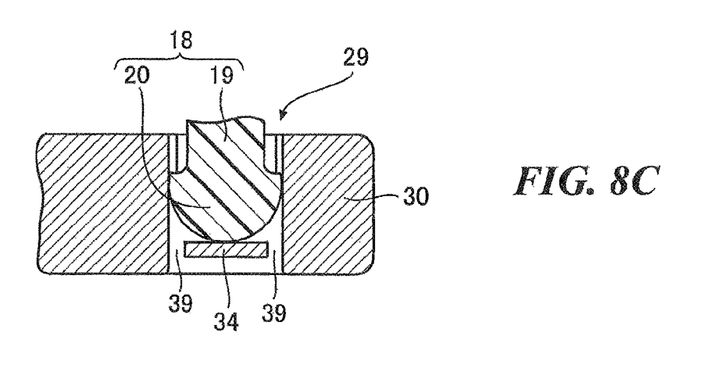
FIG. 8C is a sectional view taken along a line IV-IV' of FIG. 8A showing a state in which the projection of the rotary member is brought into engagement with the recess portion.

Another embodiment of the opening and closing member locking apparatus of the invention is shown in FIGS. 8A to 8C. This embodiment differs from the embodiment described above in that a recess portion 29 of a sliding rod 28 has a different shape from that of the recess portion 29 of the embodiment described above and is similar in the other configurations to the embodiment described above, and therefore, the description of the similar configurations will be omitted here.

In a recess portion 29 of this embodiment, a pair of slits 38 are formed individually on both sides of each of a pair of elastic side walls 32 so as to extend from an open edge of the recess portion 29 in a depth direction, whereby the elastic side walls 32 can be deformed elastically. A pair of slits 39 are formed individually on both end edges of an elastic bottom wall 34 in a lengthwise direction of the sliding rod 28, whereby the elastic bottom wall 34 can be deformed elastically.

In this way, since the pair of elastic side walls 32 and the elastic bottom wall 34 are deformed elastically due to the slits 38 and the slits 39, when a head portion 20 of a projection 18 is inserted into the recess portion 29 so that nail portions 33 of the elastic side walls 32 are brought into engagement with an engaging portion 20a of the head portion 20, the elastic side walls 32 and the elastic bottom wall 34 are brought into press contact with the head portion 20 in an elastic fashion, whereby the sliding rod 28 can be attached via a shaft portion 19 without rattling.

DESCRIPTION OF REFERENCE NUMERALS AND SIGNS

10 Locking apparatus
11 Attaching base
12 Rotary member
13 Torsional coil spring
14 Supporting shaft
18 Projection
19 Shaft portion
20 Head portion
20a Engaging portion
21 Attaching shaft
23 Supporting hole
24 Operating handle
26 Attaching hole
27 Projection
28 Sliding rod
29 Recess portion
30 Distal end portion
31 Restricting wall
32 Elastic side wall
33 Nail portion
34 Elastic bottom wall
35 Slit
36 Mount-base member
37 Engaging portion

The invention claimed is:

1. An opening and closing member locking apparatus configured to releasably lock an opening and closing member by at least one sliding rod, the opening and closing member configured to be attached to an opening portion of a mount-base member so as to be opened and closed, the locking apparatus comprising:
   a rotary member which is attached to one of the mount-base member and the opening and closing member so as to rotate via a supporting shaft;
   at least one projection which is provided on the rotary member at an eccentric position relative to the supporting shaft and which includes a diametrically-expanded head portion at a distal end of the at least one projection;
   the at least one sliding rod which is connected to the rotary member by fitting the at least one projection in a recess portion provided at a proximal end of the at least one sliding rod, which slides as the rotary member rotates, and which is disengageably brought into engagement with at least one engaging portion which is provided on the other one of the mount-base member and the opening and closing member, and
   an unlocking member which unlocks the engagement between the at least one sliding rod and the at least one engaging portion by rotating the rotary member from a state in which the at least one sliding rod is in engagement with the at least one engaging portion,
   wherein the recess portion of the at least one sliding rod includes:
      a pair of restricting walls which form inner surfaces of the recess portion facing each other in a lengthwise direction of the at least one sliding rod and which are disposed so as to restrict the head portion of the at least one projection from moving in a sliding direction; and
      a pair of elastic side walls which form other inner surfaces of the recess portion facing each other in a widthwise direction of the at least one sliding rod and which each includes a nail portion, the nail portions being brought into engagement with a proximal end side of the head portion of the at least one projection when the at least one projection is fitted in the recess portion,
   wherein the at least one sliding rod includes a first surface facing the rotary member and a second surface opposite to the first surface, wherein the recess portion includes an opening formed in a side of the first surface and a bottom wall formed on a side of the second surface, wherein the head portion of the at least one projection is inserted into the recess portion via the opening so as to fit the at least one projection in the recess portion, wherein the bottom wall is in the form of an elastic bottom wall which is brought into an elastic abutment with a distal end of the head portion of the at least one projection when the at least one projection is inserted into the recess portion, and wherein an outside surface of the bottom wall is disposed at a position closer to the first surface than to the second surface.

2. The opening and closing member locking apparatus of claim 1, wherein a distance between the elastic side walls is smaller than an outside diameter of the head portion of the at least one projection, and wherein a distance between engaging surfaces of the nail portions of the elastic side walls and the elastic bottom wall is smaller than a distance between an engaging portion of the head portion of the at least one projection which is brought into engagement with the nail portions and the distal end of the head portion when the at least one projection is inserted into the recess portion.

3. The opening and closing member locking apparatus of claim 1, wherein a pair of slits are each provided to extend along a pair of sides of the elastic bottom wall, respectively, and wherein the elastic side walls and the elastic bottom wall are allowed to deflect elastically by the slits.

4. The opening and closing member locking apparatus of claim 3, wherein a pair of ends of the pair of slits extend further outside the pair of restricting walls in the lengthwise direction.

5. The opening and closing member locking apparatus of claim 3, wherein the pair of slits longitudinally extend along the pair of elastic side walls.

6. The opening and closing member locking apparatus of claim 3, wherein, in the lengthwise direction of the at least one sliding rod, each of the pair of slits longitudinally extends along a longitudinal direction of an extension of each of the pair of elastic side walls.

7. The opening and closing member locking apparatus of claim 1, wherein the rotary member comprises:
a first surface, the at least one projection protruding from the first surface in a direction; and
a second surface facing away from the first surface of the rotary member, the supporting shaft protruding from the second surface of the rotary member in a direction opposite to the direction in which the least one projection protrudes from the first surface of the rotary member.

8. The opening and closing member locking apparatus of claim 1, wherein a diameter of the head portion decreases from a proximal end of the head portion to the distal end of the head portion.

9. The opening and closing member locking apparatus of claim 1, wherein a diameter of the head portion continuously decreases from a proximal end of the head portion to the distal end of the head portion.

10. The opening and closing member locking apparatus of claim 1, wherein the head portion of the at least one projection is semi-spherical.

11. The opening and closing member locking apparatus of claim 1, wherein a pair of slits are each provided to longitudinally extend along each of the pair of elastic side walls, respectively.

12. The opening and closing member locking apparatus of claim 11, wherein, in the lengthwise direction of the at least one sliding rod, each of the pair of slits longitudinally extends along a longitudinal direction of an extension of each of the pair of elastic side walls.

13. The opening and closing member locking apparatus of claim 1, wherein each of the nail portions longitudinally extends along each of the pair of elastic side walls, respectively.

14. The opening and closing member locking apparatus of claim 1, wherein, in the lengthwise direction of the at least one sliding rod, the nail portions longitudinally extend along a longitudinal direction of the pair of elastic side walls.

15. An opening and closing member locking apparatus, comprising:
a rotary member which rotates via a supporting shaft;
at least one projection which is provided on the rotary member and which includes a diametrically-expanded head portion at a distal end of the at least one projection;
at least one sliding rod which is connected to the rotary member by fitting the at least one projection in a recess portion provided at a proximal end of the at least one sliding rod, which slides as the rotary member rotates, and which is disengageably brought into engagement with at least one engaging portion; and
an unlocking member which unlocks the engagement between the at least one sliding rod and the at least one engaging portion by rotating the rotary member from a state in which the at least one sliding rod is in engagement with the at least one engaging portion, wherein the recess portion of the at least one sliding rod includes:
a pair of restricting walls which form inner surfaces of the recess portion facing each other in a lengthwise direction of the at least one sliding rod and which are disposed so as to restrict the head portion of the at least one projection from moving in a sliding direction; and
a pair of elastic side walls which form other inner surfaces of the recess portion facing each other in a widthwise direction of the at least one sliding rod, each of the pair of elastic side walls including a nail portion, the nail portions being brought into an engagement with a proximal end side of the head portion of the at least one projection when the at least one projection is fitted in the recess portion, wherein the at least one sliding rod includes a first surface facing the rotary member and a second surface opposite to the first surface, wherein the recess portion includes an opening formed in a side of the first surface and a bottom wall formed on a side of the second surface, wherein the head portion of the at least one projection is inserted into the recess portion via the opening so as to fit the at least one projection in the recess portion, wherein the bottom wall is in the form of an elastic bottom wall which is brought into an elastic abutment with a distal end of the head portion of the at least one projection when the at least one projection is inserted in the recess portion, and wherein an outside surface of the bottom wall is disposed at a position closer to the first surface than to the second surface.

16. The opening and closing member locking apparatus of claim 15, wherein the at least one projection is located on the rotary member at at least one eccentric position relative to the supporting shaft.

17. The opening and closing member locking apparatus of claim 15, wherein a diameter of the head portion continuously decreases from a proximal end of the head portion to the distal end of the head portion.

18. The opening and closing member locking apparatus of claim 15, wherein a pair of slits are each provided to longitudinally extend along the pair of elastic side walls, respectively, and wherein, in the lengthwise direction of the at least one sliding rod, each of the pair of slits longitudinally extends along a longitudinal direction of an extension of each of the pair of elastic side walls.

19. The opening and closing member locking apparatus of claim 15, wherein, in the lengthwise direction of the at least one sliding rod, the nail portions longitudinally extend along a longitudinal direction of the pair of elastic side walls.

\* \* \* \* \*